US010230283B2

(12) United States Patent
Garrison et al.

(10) Patent No.: US 10,230,283 B2
(45) Date of Patent: Mar. 12, 2019

(54) HYGIENIC ADAPTER FOR ELECTRICAL MOTORS

(71) Applicant: KOLLMORGEN CORPORATION, Radford, VA (US)

(72) Inventors: Kevin Garrison, Blacksburg, VA (US); Mike Conner, Copper Hill, VA (US); Eddie Anderson, Blacksburg, VA (US); Gene Matthews, Blacksburg, VA (US); Hilary Whiting, Blacksburg, VA (US); Devin Deeds, Fairlawn, VA (US)

(73) Assignee: KOLLMORGEN CORPORATION, Radford, VA (US)

( * ) Notice: Subject to any disclaimer, the term of this patent is extended or adjusted under 35 U.S.C. 154(b) by 373 days.

(21) Appl. No.: 15/254,680

(22) Filed: Sep. 1, 2016

(65) Prior Publication Data

US 2017/0070120 A1 Mar. 9, 2017

Related U.S. Application Data

(60) Provisional application No. 62/214,597, filed on Sep. 4, 2015.

(51) Int. Cl.
| H02K 5/22 | (2006.01) |
| F16L 55/07 | (2006.01) |
| H01R 13/52 | (2006.01) |
| H02K 5/10 | (2006.01) |
| H02G 3/06 | (2006.01) |
| H02G 15/06 | (2006.01) |

(52) U.S. Cl.
CPC ............. *H02K 5/225* (2013.01); *F16L 55/07* (2013.01); *H01R 13/5202* (2013.01); *H02K 5/10* (2013.01); *H02G 3/0616* (2013.01); *H02G 15/06* (2013.01); *H02K 2205/09* (2013.01)

(58) Field of Classification Search
CPC ............ H02K 5/22; H02K 5/225; H02K 5/10; H02K 2205/09; F16L 55/07; H01R 13/52; H01R 13/5202; H02G 3/0616; H02G 15/06
USPC ..................................................... 310/71, 89
See application file for complete search history.

(56) References Cited

U.S. PATENT DOCUMENTS

| 4,637,639 A * | 1/1987 | Jorgensen ............. F16L 33/222 |
| | | 285/249 |
| 7,317,269 B2 * | 1/2008 | Boyland ................ H01R 11/12 |
| | | 310/71 |
| 2016/0043503 A1 * | 2/2016 | Garske ............... H01R 13/5219 |
| | | 439/359 |

FOREIGN PATENT DOCUMENTS

| CN | 203522410 U | 4/2014 |
| CN | 204168041 U | 2/2015 |

(Continued)

OTHER PUBLICATIONS

International Search Report and Written Opinion issued in corresponding international application No. PCT/US2016/049927, dated Nov. 25, 2016.

*Primary Examiner* — Naishadh Desai
(74) *Attorney, Agent, or Firm* — Day Pitney LLP (57) ABSTRACT

A adapter for coupling a cable to a motor in a hygienic environment is provided. The hygienic adapter is non-rotatably coupled to and hygienically seals an opening of the motor housing, the hygienic adapter including a port adapted to receive the power supply cable connector such that the connector and cable are oriented parallel to the longitudinal surface of the housing and the connector is accessible to the electrical leads.

14 Claims, 8 Drawing Sheets

(56) References Cited

FOREIGN PATENT DOCUMENTS

| DE | 8914027 U1 | 1/1990 |
|---|---|---|
| EP | 1320170 A2 | 6/2003 |

\* cited by examiner

FIG. 1

PRIOR ART

HYGIENIC ADAPTER FOR ELECTRICAL MOTORS

CROSS REFERENCE TO RELATED APPLICATIONS

This patent application is filed under 35 U.S.C. § 111(a) and claims the benefit of priority under 35 U.S.C. § 119(e) to U.S. Provisional Patent Application Ser. No. 62/214,597, filed Sep. 4, 2015, which is incorporated by reference herein in its entirety for any purpose whatsoever.

BACKGROUND OF THE INVENTION

1. Field of the Invention

The subject matter disclosed herein relates generally to motor technology and more particularly to adapter apparatus for coupling a cable to a motor.

2. Description of the Related Art

A variety of commercial and industrial applications require availability of motorized power in a clean or "hygienic" environment. As one example, consider a meat processing and packing facility. Typically, a meat processor requires availability of saws and other types of heavy equipment while having to meet standards for food handling. More specifically, production requirements call for the equipment to be outfitted with motors having substantial output and competitive pressure requires that the equipment have minimal maintenance needs with a high degree of availability. Unfortunately, hygiene standards for food processing complicate use of such equipment and typically prevent operators from reaching a desired degree of equipment availability.

For example, consider that motors used in hygienic applications such as food processing are typically subject to frequent high temperature and high-pressure cleaning cycles. Cleaning cycles may involve use of corrosive cleaning agents as well as rigorous rinsing cycles. This has given rise to motors specifically designed to operate in hygienic environments.

A typical hygienic motor includes an easy to clean exterior, such as a housing with any other exposed surfaces made from stainless steel. Openings such as those needed for ventilation of the motor, are sealed to prevent infiltration and growth of bacteria. Sealing the motor also serves to protect the motor internals while facilitating and enduring harsh repeated cleaning cycles.

Figure 1:
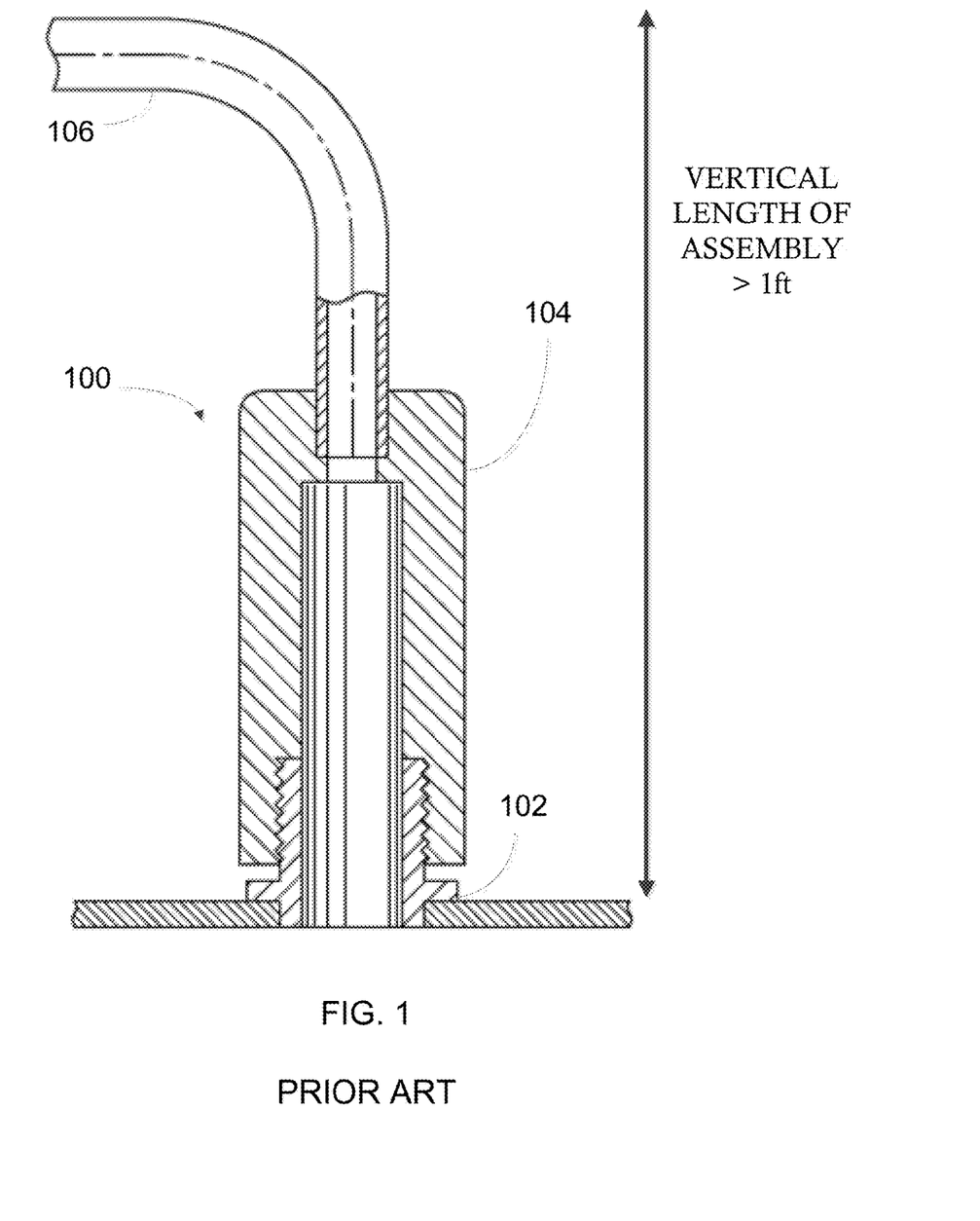
FIG. 1 is a schematic cross-sectional view of a conventional assembly for coupling an electrical cable to a motor.

However, many sealed hygienic motors available in the marketplace are not compatible with requirements set forth by the European Hygienic Engineering and Design Group (EHEDG) and suffer from additional design inefficiencies. For example, many conventional servomotor designs receive power and control signals from electrical cables via male connector ports that extend perpendicularly (referred to hereinafter as "vertically") from the surface of the motor housing. Motors that employ these connectors suffer from the disadvantages that the connectors themselves are not hygienic (i.e., the surfaces of the connectors are not designed according to specific hygienic specifications) and also that, due to their vertical orientation, they increase the vertical profile of the device. In particular, the new models of cables are cladded with materials resistant to high pressure and temperatures, which tends to make the cables more stiff and less bendable. FIG. 1 shows a schematic cross-sectional view of a conventional assembly 100 (which is not drawn to scale) in which an extending male adapter 102 couples to a female connector 104 and then to a cable 106. As illustrated, because the cables and female connectors which couple to the extending male connectors are typically thick and have a significant bend radius, the total height of the arrangement (male connector+female connector+cable) can reach over one foot. This is a considerable addition to the dimensional profile of the servomotor and particularly disadvantageous for facilities in which there is limited space available at the motor location.

Additionally, many motor housings are designed to vent through a rear cover of the housing. Placement of the vent in this exposed location detracts from the hygienic quality of the motor design because the rear cover is typically subject directly to high-pressure fluid during wash downs. Another disadvantage of this placement is that it requires the rear cover to be specially machined to incorporate a vent structure.

What are needed are solutions that enable a coupling of a cable to a hygienic motor that maintains hygienic standards, that does not significant increase the dimensional profile of the motor as a whole, or suffer from the other disadvantages of conventional motor adapters. Preferably, the solutions are simple to install, cost effective, easy to clean, and simple to maintain.

SUMMARY OF THE INVENTION

In one embodiment, a hygienic adapter for coupling an electrical cable to a motor is provided. The hygienic adapter includes a cylindrical body including an upper section having a first width and a lower section having a second width smaller than the first width, the lower section having a threaded portion adapted to be inserted into an opening in the motor and non-rotatably fastened inside the motor; a longitudinal passage through the upper and lower sections of the cylindrical body; and a flat abutment surface recessed in the upper section of the cylindrical body, the flat section including a port hole; the port hole is adapted to receive a cable connector such that the connector and cable are oriented parallel to the longitudinal surface of the housing and the connector is accessible to electrical leads of the motor via the longitudinal passage.

The upper section of the cylindrical body of the hygienic adapter may have a height of between 1.8 and 2.5 inches. The hygienic adapter may include an air vent adapted to allow an exchange of air between the motor and a local atmosphere via the longitudinal passage; the flat abutment surface may extend from a top to an intermediate point above the bottom of the upper section. The hygienic adapter may also include an O-ring formed on a bottom surface of the upper section of the cylindrical body, the O-ring adapted to promote a hygienic seal between the bottom of the upper section and a corresponding surface of the motor. The cylindrical body of the hygienic adapter may be composed of stainless steel.

In another embodiment, a system for coupling an electrical cable to a motor is disclosed. The system includes a cable connector for coupling to electrical leads of the motor; a motor housing having a longitudinal surface and an opening on the surface through which the electrical leads of the motor are accessible; and a hygienic adapter coupled to and hygienically sealing the opening of the motor housing, the hygienic adapter including a port adapted to receive the cable connector such that the connector and cable are oriented parallel to the longitudinal surface of the housing and the connector is accessible to the electrical leads; the hygienic adapter is non-rotatably fastened to the motor housing.

The hygienic adapter may include an air vent adapted to allow an exchange of air between the motor and a local atmosphere; the hygienic adapter may include a bolt that is fastened to an underside surface of the motor housing through the opening on the surface of the housing. The system may include a washer having a shape conforming to the underside surface of the housing; and a nut adapted to thread to the bolt of the hygienic adapter and fasten the washer against the underside surface of the housing. The hygienic adapter may include a cylindrical body which includes an upper section having a first width and a lower section having a second width smaller than the first width, the lower section having a threaded portion adapted to be inserted into the opening in the motor; a longitudinal passage through the upper and lower sections of the cylindrical body; and a flat abutment surface recessed in the upper section of the cylindrical body, the flat abutment surface including a port hole. The flat abutment surface may extend from a top to an intermediate point above the bottom of the upper section; the upper section of the cylindrical body may have a height of between 1.8 and 2.5 inches. The system may include an O-ring positioned to form a seal between a bottom surface of the upper section of the cylindrical body and the surface of the housing.

The hygienic adapter may be deployed on a motor of a production tool. The production tool may be used in a setting that includes one of: food and beverage; packaging and converting; pharmaceutical; material forming; medical laboratory and automation; robotics; printing; labeling; aerospace; tire and rubber; postal sorting; automated vehicle; and oil and gas industry. The electric motor may include one of: an induction motor; a synchronous motor; a shunt motor; a separately excited motor; a series motor; a permanent magnet motor; a compounded motor; a stepper motor; a brushless DC motor; a hysteresis motor; a reluctance motor; a universal motor; and another type of motor. The electric motor may be powered by one of alternating current (AC) and direct current (DC).

BRIEF DESCRIPTION OF THE DRAWINGS

The features and advantages of the invention are apparent from the following description taken in conjunction with the accompanying drawings in which.

DETAILED DESCRIPTION OF THE INVENTION

Disclosed herein is an adapter apparatus for coupling an electrical cable to a motor system such that the cable and any associated male and female connectors are oriented parallel to the surface of the motor (i.e., horizontally) rather than vertically. This reduces the vertical clearance required for the coupling assembly from approximately one foot to approximately 2-3 inches, while maintaining the hygienic characteristics of the assembly. For example, the adapter and coupling assembly comply with IP69K (standard Ingress Protection rating against close-range high pressure, high temperature spray downs) and EHEDG requirements.

Figure 6:
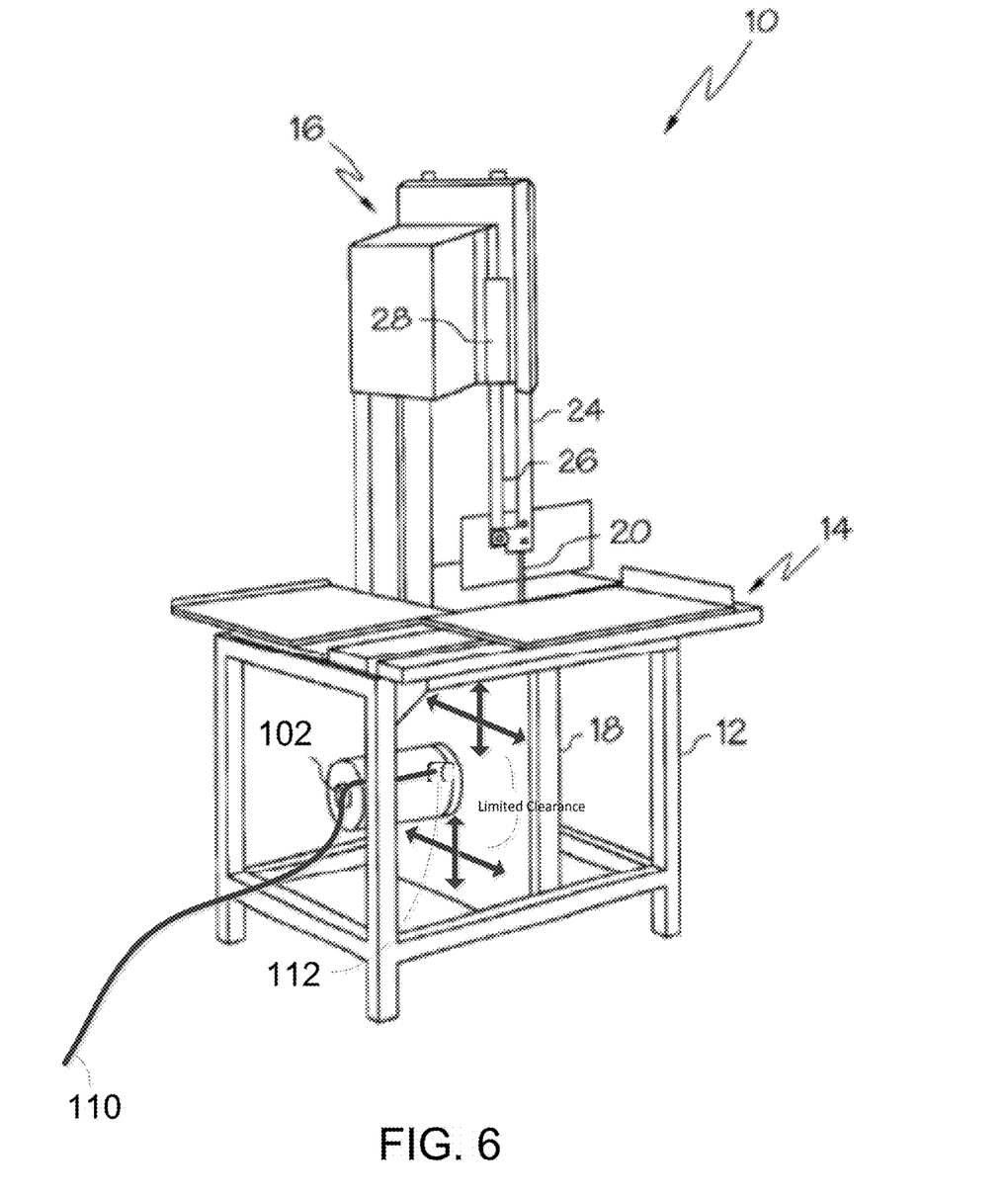
FIG. 6 is a perspective view of a food processing station that includes a hygienic motor system according to the teachings herein.

Turning to FIG. 6, an exemplary embodiment of a food processing station 10 is shown. In this example, the food processing station 10 includes band saw 16. Food processing apparatus such as band saw 16 are commonly used for cutting meat products of a variety of sizes. In the exemplary embodiment, band saw 16 includes a frame 12 upon which is mounted a support surface 14 for positioning meat products to be cut. A housing 18 extends above support surface 14 and housing 18 also extends below support surface 14. A band saw blade 20 passes through a plane defined by support surface 14 and extends around wheel members (not shown) located with housing 18 for being drivingly rotated by such wheel members. Drive motor 102 may be connected for rotating a drive wheel in housing 18. A blade guard 24 extends around the cutting edge of blade 20 and downward from housing 18 toward support surface 14. Blade guard 24 is connected to a guide bar 26 which extends upward toward housing 18 and through a guide assembly 28 which is mounted to housing 18. Guide bar 26 is slidably positioned within guide assembly 28 such that guide bar 26 can be moved upward or downward through such guide assembly if a sufficient moving force is applied thereto. However, with no moving force applied guide assembly 28 engages guide bar 26 with sufficient force to hold guide bar 26 and blade guard 24 in position. Because blade guard 24 is connected to guide bar 26 for movement therewith, the length of band saw blade 20 which is protected by the blade guard 24 can be varied by varying the position of guide bar 26 relative to guide assembly 28.

Generally, the drive motor 102 is connected to an electrical cable 110 through which power is received and control signals are received and transmitted for the operation of the motor. The electrical cable 110 includes a hygienic sheathing resistant to high temperature and pressures. The sheathing encloses a plurality of conductive wires which may be bundled. The thickness of the combined conductive wires and sheathing increases the bulk and stiffness of the cable 110. The cable 110 runs from a power supply (not shown) to an adapter 112 positioned on the housing of the motor 102. The adapter 112 forms a port for coupling the electrical conductive wires of the cable with corresponding electrical leads within the motor 102. The adapter 112 is designed according to hygienic specifications, which affect its surface characteristics, dimensions (e.g., minimal radii of surface features) and material composition.

As can be discerned in the figure, the positioning of the motor 102 within the food processing station 10 is such that there is limited clearance space (as indicated by vertical and horizontal arrows) between the surface of the motor 102 and the frame 12 of the station 10. Since the adapter 112 is situated on the housing of the motor 102, the adapter 112, and the cable 110 to which the adapter is coupled., increase the overall vertical profile of the motor 102 (e.g., the effective diameter of the motor). In some instances, given the limited clearance space, the additional vertical footprint of the adapter 112 and cable 110 can make it difficult to clean, maintain and access the motor 102 in its position within the food processing station 10.

Figures 2A, 2B:
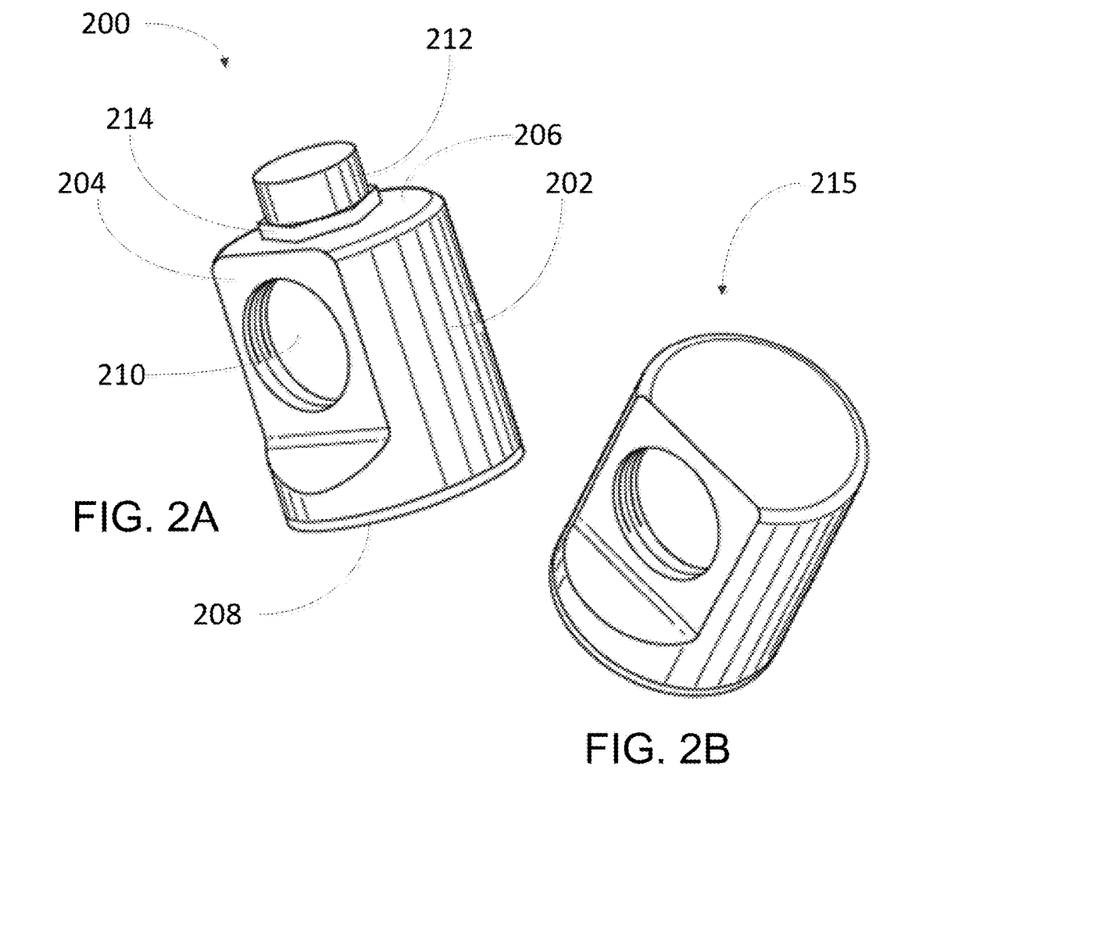
FIG. 2A is a perspective view of an adapter for coupling an electrical cable to a motor according to the teachings herein.
FIG. 2B is a perspective view of an alternative embodiment of an adapter for coupling an electrical cable according to the teachings herein.

FIG. 2A is a perspective view of an exemplary embodiment of a hygienic adapter 200. The hygienic adapter 200 includes a generally cylindrical body 202 which is preferably made from stainless steel, although other materials may be used. A flat abutment surface 204 is formed by removing or truncating a partial longitudinal section of the body 202 extending from at or near the top surface 206 to an intermediate point above the bottom 208 of the adapter. A bored port hole 210, which may be threaded, is formed on the face of the abutment surface 204 and extends into the interior of the body of the adapter. The port hole 210 is adapted to receive a standard IP69K-compliant male connector (shown in FIG. 3) or similarly shaped cable gland or grommet (shown in FIG. 5), and the abutment surface 204 is adapted to provide a sealed, hygienic contact with a corresponding surface of the male connector.

In the embodiment depicted in FIG. 2A, the adapter 200 includes an air vent 212 positioned on the top surface 208 of the adapter. When the adapter is installed on the motor, the air vent 212 is in communication with the inside of the motor via a passage within the adapter and is thus able to vent excess air pressure built up within the motor during use to the local atmosphere. The air vent 212 may include an air-permeable membrane that is simultaneously impermeable with respect to liquid water, thus preventing liquid water from entering the adapter through the vent during wash-downs while still allowing exchange of air. The air vent 212 is hygienically sealed onto the top surface 212 using an O-ring or similar sealing gasket 214. By employing a vent in the hygienic adapter itself, the embodiment of the adapter of FIG. 2A eliminates the need for incorporating a vent on the rear cover of the housing and moves the vent away from a heavy wash-down area, enhancing overall hygiene.

In the alternative embodiment of the adapter 215 depicted in FIG. 2B, an air vent is not included on the adapter, but the adapter 215 is otherwise identical to the embodiment depicted in FIG. 2A. The embodiment of FIG. 2B may be particularly advantageous when other components are employed for venting the motor.

Figure 3A:
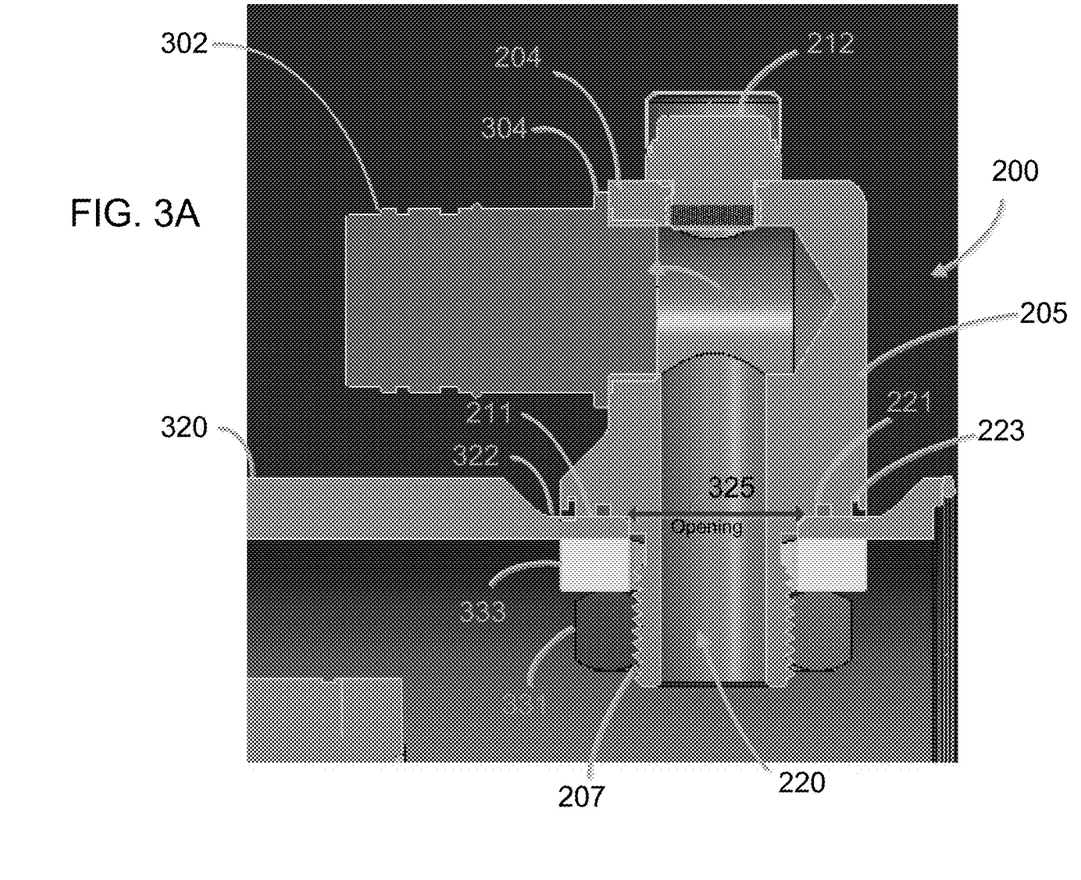
FIG. 3A is a cross-sectional view of the adapter of FIG. 2A coupled to a standard male and connector according to the teachings herein.

Reference is now made to FIG. 3A, which is a cross-sectional view of the adapter shown in FIG. 2A coupled to a standard male cable connector. In the view depicted in FIG. 3A the electrical terminals of the connectors and motor are not shown to more clearly depict the structural features of the assembly. As shown, a standard male connector 302 is inserted at a first end into the port hole 210 of hygienic adapter 200. Both the male connector 302 and port hole 210 may be threaded to provide a secure coupling between the male connector 302 and adapter 200. In addition, the connector includes an annular collar 304 which abuts in a flush manner against the abutment surface 204 of the adapter, providing a hygienic surface by preventing moisture from entering the adapter at the coupling. The male connector 304 typically also couples to a female connector at a second end (not shown), which in turn couples to a power supply and control signal cable (also not shown).

In the embodiment of FIG. 3A, the body of the adapter 200 includes an upper annular section 205 having a first radius and second lower annular section 207 having a second radius smaller than the first radius. The lower section 207 forms a threaded bolt intended to extended into an opening 325 on the housing surface 320 of the motor for receiving the adapter 200. At the point at which the upper section 205 narrows into the lower section 207, a flat flange 211 is formed which provides a seating surface for the adapter on a corresponding flat section of the motor housing 322. To further promote hygiene and ensure that moisture cannot enter the motor via the interface where the flange 211 rests on the housing 322, the flange 211 includes recesses in which O-rings 221, 223 may be inserted. The O-rings 221, 223 are typically made of a plastic or rubber material that is hydrophobic and adheres strongly to the surface of the housing by surface tension. Both the upper and lower sections of the adapter 205, 207, are annular and hollow, and include an internal passage 220. In the embodiment depicted, the communication between the passage 220 and opening 325 allows air to flow from the motor through the passage 220 to air vent 212, allowing any air pressure differential between the inside of the motor and the local atmosphere to be equalized.

When the bolt 207 of adapter 200 is first inserted into the opening 325 it can be placed in any orientation for receiving a cable. In other words, the port hole 210 of the adapter 200 can be oriented to face any direction in a horizontal plane parallel to the motor housing surface. However, once the adapter 200 is fastened to the motor housing 320, the coupling between the adapter 200 and the motor 320 becomes very robust and non-rotatable (e.g. by bolting). The robust coupling between the adapter 200 and the motor housing 320 aids in preventing damage during any rough handling of the motor that may occur during maintenance, repair or repositioning. Additionally, while the initial orientations of the adapters on the motor housing are optional, it is preferable that once the initial orientations are selected, and the adapters are fixed according to the selected orientations, that further rotations should not occur. This because a rotatable coupling gives some amount of 'play' and may provide potential spaces for microbes to infiltrate into the housing or adapter.

Figure 3B:
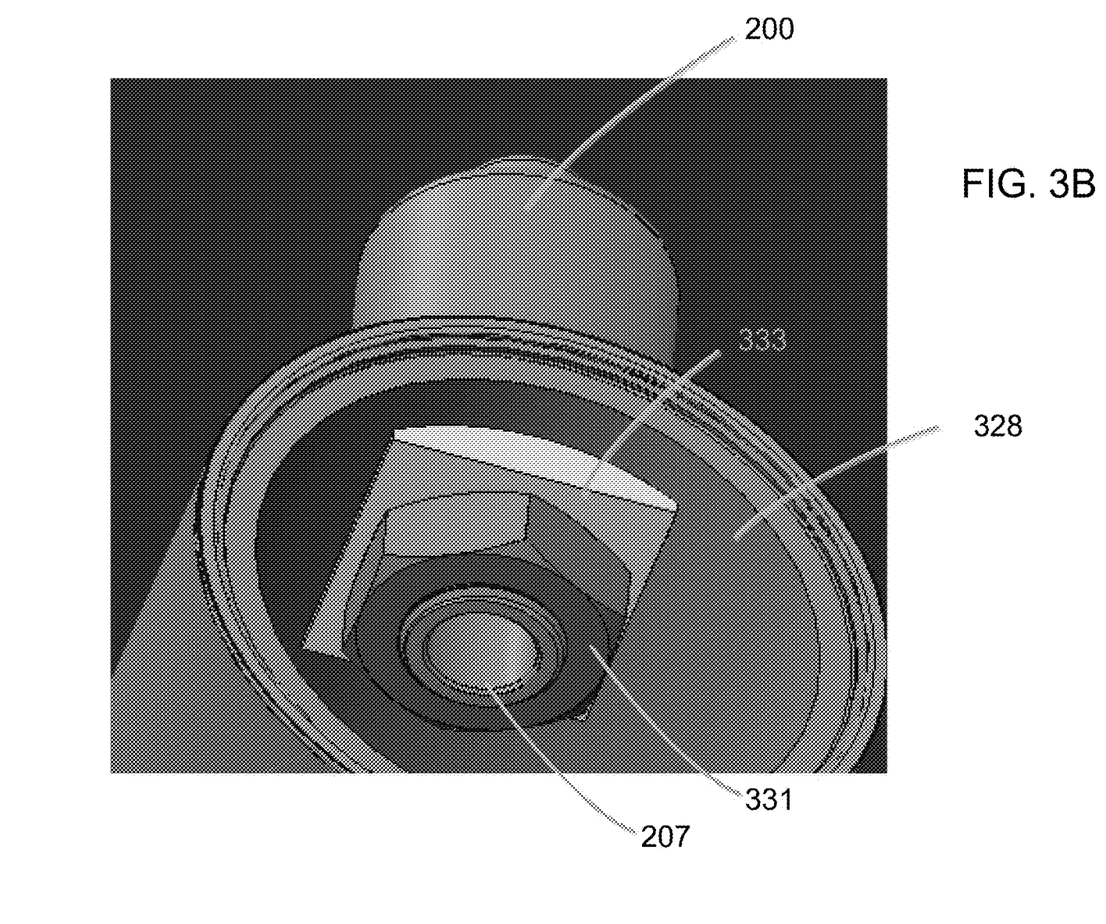
FIG. 3B is a bottom perspective view from within a motor housing showing the coupling of the adapter to the underside of the motor housing according to the teachings herein.

The flat section of the motor housing 322 may be relatively thin. For example, the flat section 322 may have a thickness ranging between 0.125 and 0.025 inches. It may therefore be difficult to form threads through the housing surface in the flat section 322 as there may not be enough length to form sufficient threads. Accordingly, as shown in FIG. 3A, the fastening of the adapter 200 to the motor housing is provided by the combination of a nut 331, which is threaded onto the bolt 207, and a washer 333, which is positioned between the nut 331 and the flat section of the motor housing 322. FIG. 3B is a bottom perspective view from within the motor housing showing the coupling of the adapter 200 to the underside of the motor housing 328. As shown, the upper surface of washer 333 is shaped to conform to the curved internal surface of the motor housing 328. When the nut is fastened against the internal housing surface 328 by the nut 331, the conformation in shape between the washer 333 and the internal surface 328 form a robust seal.

Figure 3C:
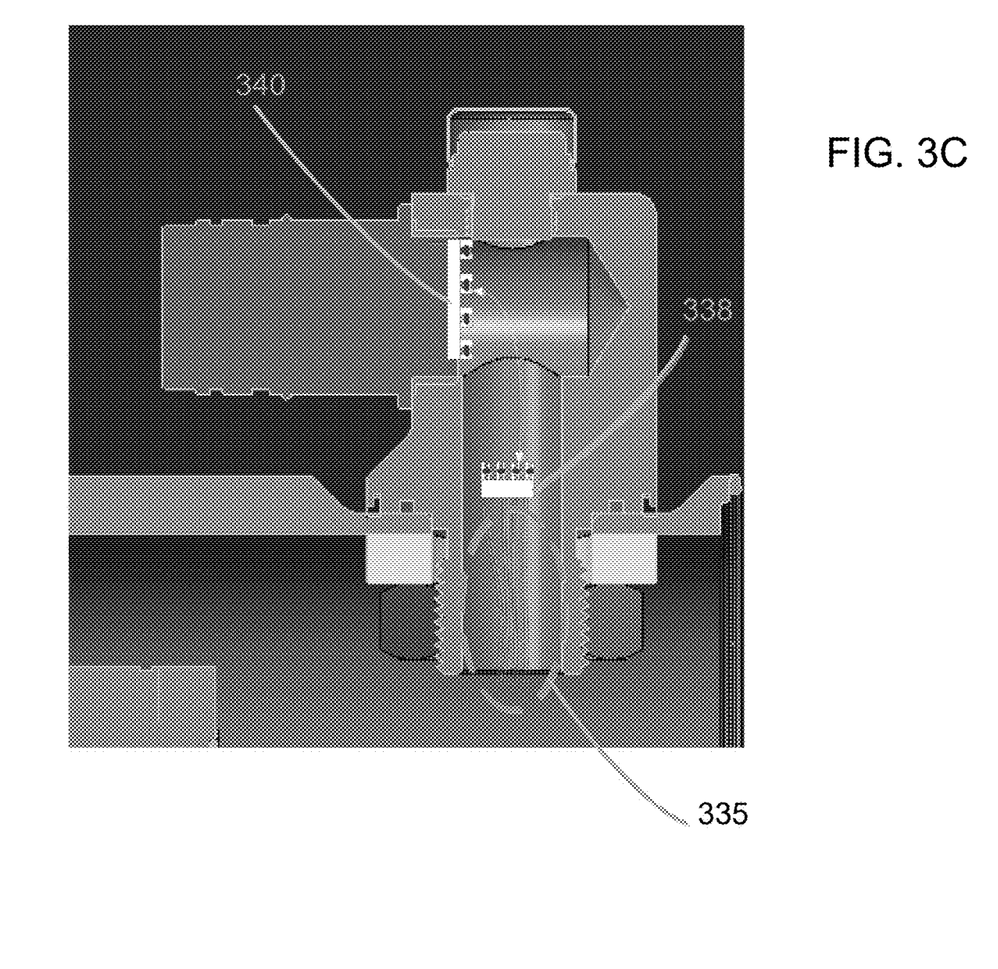
FIG. 3C is a cross-sectional view of the adapter of FIG. 2A illustrating how electrical leads from the motor couple to a corresponding fixture of the male connector according to the teachings herein.

As noted above, the adapter 200 enables internal electrical lead wires coupled to the stator of the motor to be coupled to a cable. The communication between the passage 220 and housing opening 325 enables electrical lead wires for receiving power and control signals coupled to the stator within the motor to be coupled to pins of the male connector 302 within the adapter 200. In FIG. 3C, an exemplary set of electrical lead wires 335 coupled to the stator of the motor (not shown) is inserted from the opening 325 of the housing into the internal passage 220 of the adapter 200. The set of lead wires 335 terminate in a fixture 338, which may be implemented using a set conductive pins, that is adapted to mate with a corresponding fixture 340 of the male connector 302 within the passage 220, as indicated by the double-headed arrow in FIG. 3C.

Figure 4:
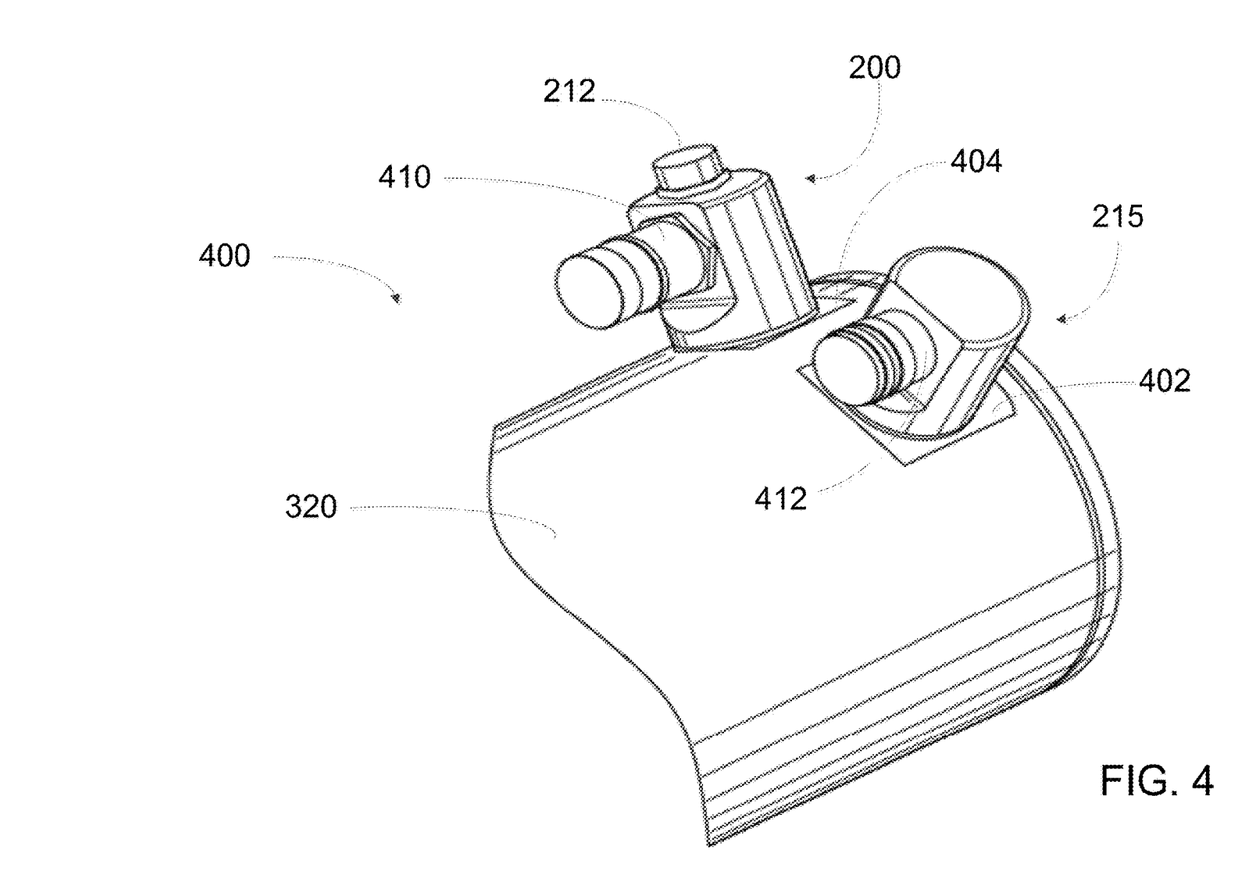
FIG. 4 is a top, right perspective view of a system for coupling an electrical cable to a motor according to the teachings herein.

Referring now to FIG. 4, a perspective view of a system 400 for coupling a cable to a motor is shown which includes embodiments of hygienic adapters fixed in position on a motor housing and coupled to male connectors for attaching the cable. As shown, the motor housing surface 320 includes recessed flat sections 402, 404 that provide hygienic seats for two adapters 200, 215 in accordance with hygienic requirements regarding the evenness of surfaces, component radial dimensions, etc. Although two adapters are shown in the embodiment of FIG. 4, in other embodiments, a single adapter may be used. The adapters 200, 215 are fixed to the motors by a non-rotatable coupling, such as by bolting as discussed above.

The arrangement shown in FIG. 4 has the benefit that male connectors 410, 412, and the further components which connect to the male connectors in turn, such as female connectors and cables, are oriented horizontally, approximately parallel to the longitudinal surface of the motor housing. The parallel, horizontal orientation provides more convenient installation and/or repositioning of motor units in facilities as the vertical profile of the motor is greatly reduced. The vertical profile in the example shown is the height of the adapter, which may be approximately 1.8 to 2.5 inches, in contrast with the conventional assembly shown in FIG. 1, which as noted can be over one foot due largely to the bend radius constraints of the cable. The savings of almost 11 inches in vertical profile enables customers to work around the extra stiffness of the newer models of cables. In addition, including the vent on the adapter eliminates the need to machine the rear cover to include a vent, and allows the adapters and connectors to be repaired or replaced without opening the cover of the motor.

Figure 5:
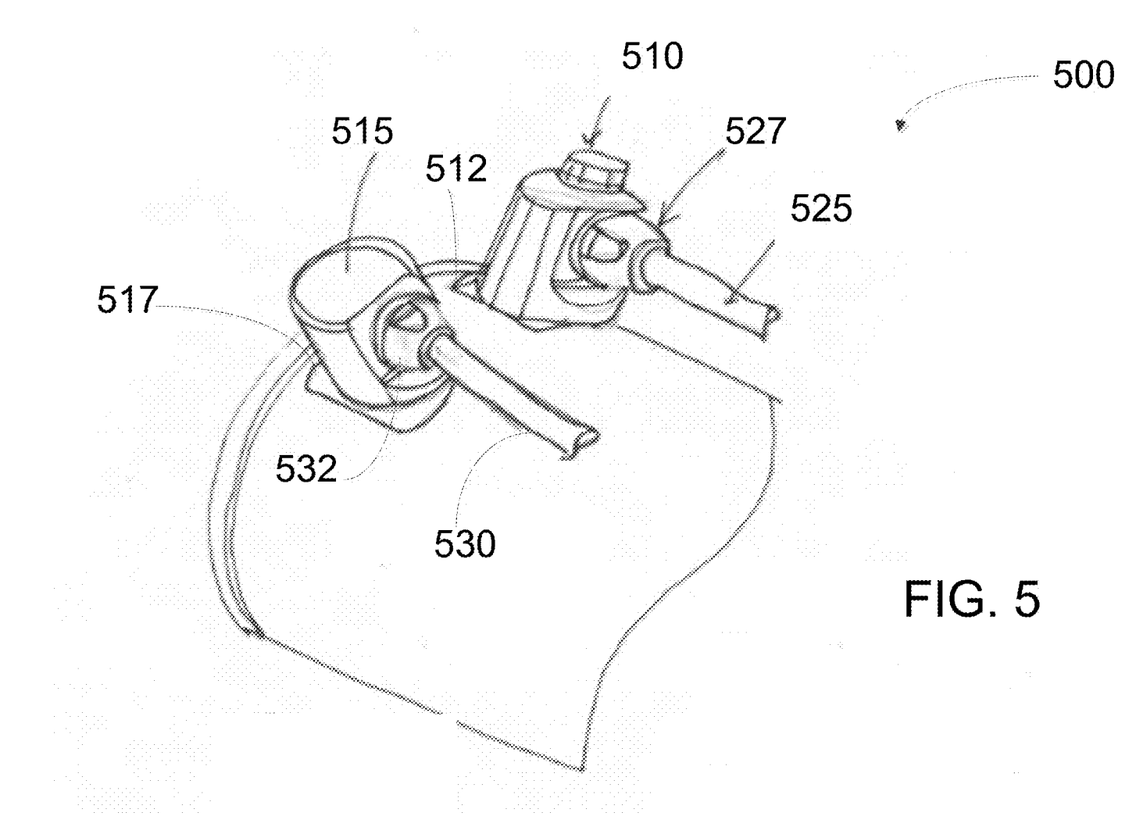
FIG. 5 is a top, left perspective view of an alternative system for coupling an electrical cable to a motor according to the teachings herein.

An alternative embodiment of a coupling system 500 using a hygienic adapter is shown in FIG. 5. Adapters 510, 515 are seated to in respective flat sections 512, 517 on housing 520. A first cable 525 includes a grommet 527 and/or cable gland at a distal end which is inserted and fastened directly into the port hole of adapter 510. Similarly, a second cable 530 includes a grommet and/or cable gland 532 at a distal end which is inserted and fastened directly into the port hole of adapter 515. Thus in system 500, connectors already in place on the cables 525, 530 are utilized as a substitute for standard male and/or female connectors for coupling the cables to the respective adapters 510, 515.

It should be noted that many other hygienic adapter configurations are possible. For example, connector mounting angles may be varied, and single or multiple adapters may be used. In some implementations multiple connectors may be coupled using only a single adapter. In addition, single/dual cables with grommets and cable glands may be used Having thus introduced aspects of the invention, some additional features, embodiments and considerations are now set forth.

Although the food processing station is shown as including a band saw, any type of equipment deemed appropriate may make use of the drive motor as disclosed herein. Further, the drive motor need not be deployed in a food processing station. For example, the drive motor may be used in industries or settings involved with food and beverage; packaging and converting; pharmaceutical; material forming; medical laboratory and automation; robotics; printing; labeling; aerospace; tire and rubber; postal sorting; automated vehicles; oil and gas; and any other environment deemed appropriate.

In this example, drive motor is a "hygienic motor." That is, the drive motor is designed to withstand the rigors of operation and periodic cleaning in an environment where standards for hygiene are imposed. As an example, the Food and Drug Administration (FDA) has set forth Current Good Manufacturing Practices (CGMP) for meat and poultry manufacturing equipment design. See "Good Manufacturing Practices (GMPs) for the 21$^{st}$ Century-Food Processing, Appendix A" Aug. 9, 2004. In this guidance, the FDA has suggested standards (referred to as "preventive controls") for processing equipment. These standards include: the processing equipment should be of sanitary design; it must be cleanable down to the microbiological level; it must be made of compatible materials; it must be accessible for inspection, maintenance, cleaning, and sanitation; it must be self-draining (i.e., does not allow for product or liquid collection); it must have its hollow areas hermetically sealed; it must be free of niches; it must have sanitary operational performance; it must have its maintenance enclosures hygienically designed; it must be hygienically compatible with other plant systems; and it must have a validated cleaning and sanitizing protocol. Of course, a variety of other standards, rules or regulations may be applicable and/or promulgated by other agencies or rule making bodies.

A variety of sanitizing agents may be used to sanitize equipment such as the drive motor 102. Examples include agents containing quaternary ammonium compounds (QACs), such as peroxyacetic acid, iodine, or chlorine. A variety of other agents are known and widely used.

The drive motor may include any type of motor deemed appropriate. For example, the drive motor be driven by alternating current (AC) or direct current (DC). For example, the drive motor may include, without limitation: an induction motor; a synchronous motor; a shunt motor; a separately excited motor; a series motor; a permanent magnet motor; a compounded motor; a stepper motor; a brushless DC motor; a hysteresis motor; a reluctance motor; a universal motor; and any one or more of a variety of other types of motors. The drive motor may include any type of material deemed appropriate. For example, stainless steel may be used. As another example, polymeric materials may be used and may include bactericides disposed therein.

The teachings herein may be used to supply a kit for retrofit of existing equipment. For example, a suitable enclosure (not shown) may be provided that provides for hygienic sealing of a standard motor. In this embodiment, the hygienic enclosure may be configured to hygienically seal the standard motor from the environment, and is therefore configured with a cable port that is externally similar to that on the drive motor, while internally providing conventional connections to the standard motor.

It should be noted that venting of the hygienic motor, as described herein, is generally with regard to equalizing pressure or avoiding pressure differentials. In some embodiments, the teachings herein may be adapted for other purposes, such as to provide some degree of cooling. For example, the vents on the adapters discussed herein may be adapted with a powered supply of air that results in the carrying away of heat from the drive motor.

It should be noted that some of the terminology set forth herein may be in agreement, or only partially an agreement with terminology set forth in the prior related provisional patent application. One skilled in the art will recognize the various uses of terms and be able to make the distinctions. However, if a conflict should exist, terminology is set forth in this disclosure shall prevail. It should be recognized that some adjustment and terminology has been provided to simplify explanation. No conflicts in terminology should be construed or inferred.

Terms of orientation are used herein merely for purposes of convention and referencing, and are not to be construed as limiting.

Standards for performance, materials, assembly or other such parameters are to be judged by a designer, manufacturer, user, owner, operator or other similarly interested party. No particular requirements for any standards are implied or to be inferred by the disclosure here.

All statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Various other components may be included and called upon for providing for aspects of the teachings herein. For example, additional materials, combinations of materials and/or omission of materials may be used to provide for added embodiments that are within the scope of the teachings herein.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements. The usage of the term "exemplary" is to be construed as meaning one of many possible embodiments. The term "exemplary" is not to be construed as being necessarily indicative of a superior or superlative embodiment, although, in some instances this may be the case.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A hygienic adapter for coupling an electrical cable to a motor comprising:
   a cylindrical body including an upper section having a first width and a lower section having a second width smaller than the first width, the lower section having a threaded portion adapted to be inserted into an opening in the motor and non-rotatably fastened inside the motor;
   a longitudinal passage through the upper and lower sections of the cylindrical body; and
   a flat abutment surface recessed in the upper section of the cylindrical body, the flat abutment surface including a port hole;
   wherein the port hole is adapted to receive a cable connector such that the connector and cable are oriented parallel to the longitudinal surface of the housing and the connector is accessible to electrical leads of the motor via the longitudinal passage.

2. The hygienic adapter of claim 1, wherein the upper section of the cylindrical body has a height of between 1.8 and 2.5 inches.

3. The hygienic adapter of claim 1, further comprising:
   an air vent adapted to allow an exchange of air between the motor and a local atmosphere via the longitudinal passage.

4. The hygienic adapter of claim 1, wherein the abutment surface extends from a top to an intermediate point above a bottom of the upper section.

5. The hygienic adapter of claim 1, further comprising:
   an O-ring formed on a bottom surface of the upper section of the cylindrical body, the O-ring adapted to promote a hygienic seal between the bottom of the upper section and a corresponding surface of the motor.

6. The hygienic adapter of claim 1, wherein the cylindrical body is composed of stainless steel.

7. A system for coupling an electrical cable to a motor comprising:
   a cable connector for coupling to electrical leads of the motor;
   a motor housing having a longitudinal surface and an opening on the surface through which the electrical leads of the motor are accessible; and
   a hygienic adapter coupled to and hygienically sealing the opening of the motor housing, the hygienic adapter including a port adapted to receive the cable connector such that the connector and cable are oriented parallel to the longitudinal surface of the housing and the connector is accessible to the electrical leads;
   wherein the hygienic adapter is non-rotatably fastened to the motor housing.

8. The system of claim 7, wherein the hygienic adapter includes an air vent adapted to allow an exchange of air between the motor and a local atmosphere.

9. The system of claim 7, wherein the hygienic adapter includes a bolt that is fastened to an underside surface of the motor housing through the opening on the surface of the housing.

10. The system of claim 9, further comprising:
    a washer having a shape conforming to the underside surface of the housing; and
    a nut adapted to thread to the bolt of the hygienic adapter and fasten the washer against the underside surface of the housing.

11. The system of claim 7, wherein the hygienic adapter includes:

a cylindrical body including an upper section having a first width and a lower section having a second width smaller than the first width, the lower section having a threaded portion adapted to be inserted into the opening in the motor;

a longitudinal passage through the upper and lower sections of the cylindrical body; and a flat abutment surface recessed in the upper section of the cylindrical body, the flat abutment surface including a port hole.

12. The system of claim 11, wherein the flat abutment surface extends from a top to an intermediate point above a bottom of the upper section.

13. The system of claim 11, wherein the upper section of the cylindrical body has a height of between 1.8 and 2.5 inches.

14. The system of claim 7, further comprising:

an O-ring positioned to form a seal between a bottom surface of the upper section of the cylindrical body and the surface of the housing.

* * * * *